United States Patent [19]

Ehbets

[11] Patent Number: 5,771,099
[45] Date of Patent: Jun. 23, 1998

[54] OPTICAL DEVICE FOR DETERMINING THE LOCATION OF A REFLECTIVE TARGET

[75] Inventor: Hartmut Ehbets, Platz, Switzerland

[73] Assignee: Leica AG, Heerbrugg, Switzerland

[21] Appl. No.: 750,837

[22] PCT Filed: May 11, 1995

[86] PCT No.: PCT/EP95/01781

§ 371 Date: Dec. 19, 1996

§ 102(e) Date: Dec. 19, 1996

[87] PCT Pub. No.: WO95/35480

PCT Pub. Date: Dec. 28, 1995

[30] Foreign Application Priority Data

Jun. 22, 1994 [DE] Germany ............................ 44 21 783.8

[51] Int. Cl.[6] ............................ G01B 11/00; G01C 15/02
[52] U.S. Cl. ............................................... 356/375; 33/293
[58] Field of Search .............................. 356/375; 33/293, 33/286

[56] References Cited

U.S. PATENT DOCUMENTS 3,188,739 6/1965 Olsen et al. ................................ 33/293
5,207,003 5/1993 Yamada et al. ............................ 33/293

OTHER PUBLICATIONS

Huep et al., "Theodolite Systems For Industrial And Geodatic Measurements", *Technische Rundschau*, No. 39:14–18, (1988).

"Theodolites–Sensors For Industrial Surveying", Opticus No. 1/94, pp. 8–9 from Leica AG.

*Primary Examiner*—F. L. Evans
*Attorney, Agent, or Firm*—Foley & Lardner

[57] ABSTRACT

The invention relates to an optical device by means of which the direction of a graticule may be measured with high precision. To this end, the graticule is illuminated by a spotlight and the light reflecting from it collected by a theodolite telescope and a locating detector. To increase the range and to improve accuracy of measurement, use is made not of a conventional spherical metal graticule but a sphere of transparent material the refractive index n of which is greater than the square root of 2 and smaller than 2.

22 Claims, 4 Drawing Sheets

OPTICAL DEVICE FOR DETERMINING THE LOCATION OF A REFLECTIVE TARGET

BACKGROUND

The invention relates to an optical device for determining the location of a reflective target, having a spotlight for illuminating the target, an imaging system for imaging the target onto a position-resolving detector device and an evaluation device for determining the position coordinates of the target image.

U.S. Pat. No. 3,188,739 discloses a target which is a transparent sphere having a marked center. The marking is carried out by means of a drilling along a radial line of the sphere as far as the center of the sphere. In addition, the marking of the center of the sphere can be reinforced by illuminating the drilled hole. Another possibility for marking results from the use of luminescent materials which are melted into the center of the sphere. Using spheres marked in this way, a determination of the distance between two points in space is possible in a known way by means of triangulation with the aid of theodolites.

German Publication DE 40 13 576 Al discloses an opaque glass sphere which is used as a target for determining measurement points using optical sights. As a result of the translucent, light-scattering material of the sphere, a homogeneous lightness of the sphere surface is achieved, which makes sighting from a large angular range possible.

U.S. Pat. No. 5,207,003 describes a target having at least four conventional retroreflectors and a spherical reflector, with which the three-dimensional position and the angular location of the target is measured. For this purpose, the target is illuminated by a light source via a semitransparent scattering mirror. The light reflected from the spherical reflector and the four retroreflectors passes via some optics to a photographic detector. In this case, the center of curvature of the spherical reflector and the retroreflectors are imaged as spots of light. From the coordinates of these spots of light on the detector, the three-dimensional position and the angular location of the target and the object connected to it are determined by computation.

Further optical devices of the said type are known and extensively represented in the publication Technische Rundschau No. 39, 1988, pp. 14–18 under the title "Theodolitsysteme für industrielle und geodätische Messungen" [Theodolite systems for industrial and geodatic measurements] by W. Huep, O. Katowski, and in the publication Opticus No. 1/94, pp. 8–9 from Leica AG in an article under the title "Theodolite-Sensoren für die industrielle Vermessung" [Theodolites-sensors for industrial surveying].

The theodolite systems which are described in these publications are employed for the non-contacting surveying of surfaces such as, for example, the panels of aircraft or car body parts. The theodolite systems used have a compact structure with a theodolite telescope as an imaging system, a spotlight arranged coaxially therewith for illuminating the target, a video camera with a CCD array and an electronic evaluation device, which may also contain an image processing computer and appropriate software. In addition, the theodolite system may also be equipped with a distance measuring device.

The theodolite systems are equipped with electronic circular taps and motorized drives for the horizontal and vertical adjustments of the telescope, with the result that an automatic, remotely controlled measurement sequence is possible. The horizontal and vertical angles indicate the directions to the targets in a given coordinate system.

In order to achieve an objective and precise measurement of direction, the video camera is used with the inclusion of image processing algorithms. The target image produced on the CCD array of the camera is evaluated with the aid of suitable algorithms and the center of the target image is determined. The coordinates of this center on the CCD array are then converted by means of software into displacement angles which, together with electronic circle read-outs yield the direction to the target.

Using the measurements of direction, the three-dimensional target coordinates are in turn determined if there is additional information. In the case of the polar method, a distance measurement is undertaken in addition to the angular measurement. On the other hand, the triangulation method uses a second theodolite system of known position and determines the positions of the targets trigonometrically via pure angular measurements.

A light-emitting diode (so-called high radiance diode) emitting with high beam density in the near infrared is generally used as a radiation source for the spotlight.

Used as targets for surveying the object are surface-reflective spheres, for example chrome-plated polished steel spheres which exhibit the required property that the same target image is presented independent of the direction of observation of the respective theodolite. Located on these surface-reflective spheres are centered fastening elements, by use of which these targets can be fitted reproducibly at the positions provided therefor on the surface to be surveyed. Rod-shaped mounts can also be used, on which the spheres rest.

The reflective spheres used, which normally have a diameter of about 12 mm, generate a virtual image, apparently located in the interior of the sphere, of the spotlight pupil of the theodolite approximately in the focal plane of the sphere surface, that is to say at approximately one quarter of the sphere diameter behind the vertex of the sphere surface. This image is observed using the telescope of the theodolite or is recorded by video camera and displayed on the CCD array.

Because of the small focal length of the surface-reflective spheres, of about 3 mm in the case of sphere diameters of about 12 mm, the pupil image in the sphere is already small, limited by diffraction, above about 1.5 m distance and is hence smaller than a receiving element of the CCD array. In order that an evaluation can nevertheless be carried out, the theodolite telescope has to be defocused in such a way that the target image is distributed onto several pixels of the camera. The center of this spot of light, obtained in this manner, can be determined by determining the center of gravity or by evaluating the contour. Nevertheless, the different intensity distribution of the radiation in the spot of light and its unsharp edge leads to a measurement of the direction of the sphere which is only of limited precision. Likewise, slight contamination of the sphere leads to a different intensity distribution of the radiation in the spot of light and hence to measurement errors.

A further problem of the imaging by means of reflective spherical surfaces results from the fact that the radiation power reflected back by these spheres into the telescope objective falls off with the 4th power of the distance from the spotlight limiting distance. This has the consequence that this measurement method can be applied only up to distances of about 10 m. In the case of greater distances, the received signal is no longer sufficient for a measurement of the direction and hence ultimately for a three-dimensional position determination, even if larger spheres are used.

SUMMARY OF THE INVENTION

Proceeding from this prior art, the invention is based on the object of specifying an optical device and a method for determining the location of the target image on a position-sensitive detector, in which this determination of location and hence the measurement of the direction of the target becomes possible over relatively large distances, can be carried out with higher precision, is insensitive to contamination and is insensitive to imaging conditions of the target which are limited by fastening elements.

According to the invention, this object is achieved by employing a sphere as a target which is transparent to the spotlight illumination and has a refractive index n between √2 wherein 2, and the target image is at least part of a circular annular area, the center of which, determined by image evaluation, indicates the location of the target. A particular method comprises the steps that the imaging system is defocused and the multiple circular annular areas produced thereby are picked up by the detector device and evaluated using mathematical means to determine the center of the target.

Advantageous developments and improvements of the invention emerge from the features described below.

The advantages of the invention lie, on the one hand, in the dramatic increase in the radiation power at the location of the detector device by means of the use of spherical targets which are transparent to the illumination radiation of the spotlight, whose refractive index for this radiation is greater than √2 and smaller than 2. Spheres of this type have the optical property that the major portion of the incident radiation enters into the sphere material as a result of optical refraction and, after passing through the sphere, a specific proportion of the radiation is reflected at the rear surface of the sphere, that is to say at the interface between sphere material and external medium (including air). The major portion of this reflected radiation emerges from the sphere, with refraction, following a further passage through the sphere.

If one considers a parallel beam which is incident on the sphere, the individual rays of this beam will pass through the sphere in the manner just described and, depending on the location of their entry into the sphere, these rays will leave with different exit angles and also at different exit locations. The invention, then, makes use of the knowledge that rays within one area of exit locations, that is to say within a specific spherical zone, leave the sphere under such exit angles that they can be picked up by an imaging system. For instance, the telescope objective of a theodolite is envisaged as an imaging system. The radiation power which is reflected back into the telescope objective from such a spherical zone in this case falls off only with the 3rd power of the distance.

A sphere having the refractive index n=√2 represents a limiting case. A marginal ray which is incident tangentially on the sphere surface and enters into the sphere with refraction will be partly reflected at the rear of the sphere and emerges tangentially on the opposite side of the sphere, to be precise parallel to the incident ray. It is registered by the imaging optics of the theodolite, as are rays close to the axis, which run close to the axis of the theodolite and the center of the sphere. All other incident rays are reflected divergently in such a way that they cannot pass into the telescope objective.

In the case of a refractive index which is only slightly greater than √2, there is already a corresponding spherical zone from which the rays pass into the telescope objective and by means of which the detected signal still only falls off with the third power of the distance. The width and the diameter of the spherical zone are different, depending on the refractive index of the sphere. With increasing refractive index, the diameter of this spherical zone decreases, being identical to the sphere diameter in the case n=√2, until it becomes zero in the other limiting case at a refractive index of n=√2. Outside the refractive index range mentioned, this spherical zone does not exist.

The following example will show how extraordinarily effective the increase in the received power is when such a transparent sphere is used, a video theodolite having a telescope aperture of 42 mm diameter having been used:

Using a commercially available sphere made of glass with a refractive index of n=1.83 and having a diameter of 2 mm, at a distance of 10 m the radiation power received is higher by a factor of 50 than in the case of using a chrome-plated steel sphere having a diameter of 10 mm.

At a distance of 20 meters, the improvement factor is already 100, although the reflection coefficient after the passage through the transparent sphere is only about 8% in comparison to about 60% in the case of the chrome-plated steel sphere.

The intensity of the reflected radiation, which is increased by such factors, now makes it possible to survey the object at a correspondingly greater distance from the theodolite.

A second advantage of the invention emerges from the fact that the spherical zone from which the radiation received by the theodolite telescope emerges has the shape of a ring. This annular exit zone is located coaxially in relation to the axis of the center of the sphere and the center of the exit pupil of the spotlight illumination and, by focusing the theodolite telescope, is imaged in sharply drawn fashion in the image plane, that is to say at the location of the detection device. Hence, when a video camera is used, the target image always illuminates a large number of pixels of the CCD array, just as in the case of focused telescope adjustment, in contrast with the target image of a steel sphere. In addition, the annular radiation distribution now advantageously makes possible the use of circle-fitting algorithms with which the center of the sphere of the target and hence, by means of a combination with a distance measurement, its position in 3-dimensional space can be determined highly precisely. The precision of such an evaluation is considerably higher than the determination of the center of an unsharp spot of light by determining the center of gravity or evaluating the contour, as already described at the beginning in the case of the conventional methods.

The target according to the invention supplies a target image which can be evaluated very well not only in the case of a focused setting of the theodolite telescope but also in the case of a defocused setting. If the reflection of the illumination radiation takes place via a small mirror on the optical axis within the theodolite, then in the case of a defocused theodolite telescope, two coaxial, annularly radiating regions occur, which are brought about as a result of the fact that the receiving objective is shadowed in its central region by the small mirror. These annular zones can also be evaluated using mathematical means for the purpose of determining the center of the target, the accuracy of the determination of the center being able to be increased further by means of averaging.

The annular radiation distribution and the use made possible thereby of circle-fitting algorithms offer a further great advantage. In many investigations it has transpired that the location of the center of the sphere of a target can be determined with constantly high precision, even in the case of a dirty sphere surface or in the case of vignetting which is caused by the sphere mount. This effect results from the manifold redundant information of the circular annular area, so that local interruptions to or blurring of the circular ring can be averaged out or removed from the evaluation. On the other hand, in the case of using metal spheres with defocused reflections, there is always the risk that measurement errors which may not be eliminated occur as a result of contaminated surfaces.

As a rule, use is made of surface-polished spheres, since otherwise the scattered light which is produced on a rough surface would reduce the usable radiation intensity. Likewise, reflection-enhancing coatings can increase the radiation intensity reflected by the sphere. The coating can be carried out over the entire sphere surface, since the proportions of the radiation reflected at the transition into media of different refractive indices only lie in the percentage range here. For this reason, the radiation intensity reflected by the sphere into the theodolite telescope is primarily determined by the reflection at the "rear" of the sphere.

In this region, the reflection can be sharply increased by silvering a small area. However, this advantage is obtained at the cost that the sphere has a preferential direction as a result of the partial silvering and cannot simply be placed on a holder without being oriented. When using the triangulation method, in particular, in which two or more theodolites are used for measuring the direction of the sphere as target, the usable angular range for the theodolites is restricted by the size of the reflective surface. Without silvering, the sphere may be sighted from all sides.

An increase in the radiation intensity reflected by the sphere can also be achieved by means of different materials within the sphere. In the case of using materials having different, stepped or continuously extending refractive indices, the rays are no longer propagated linearly within the sphere but on curved paths. As a result, the exit angles of the rays are influenced, so that in the case of a suitable refractive index profile, an increased proportion of the radiation can be received by the theodolite.

BRIEF DESCRIPTION OF THE DRAWINGS

Two exemplary embodiments of the invention will be explained in more detail below by reference to the drawings, in which.

DETAIL DESCRIPTION OF EXEMPLARY EMBODIMENTS

Figure 1:
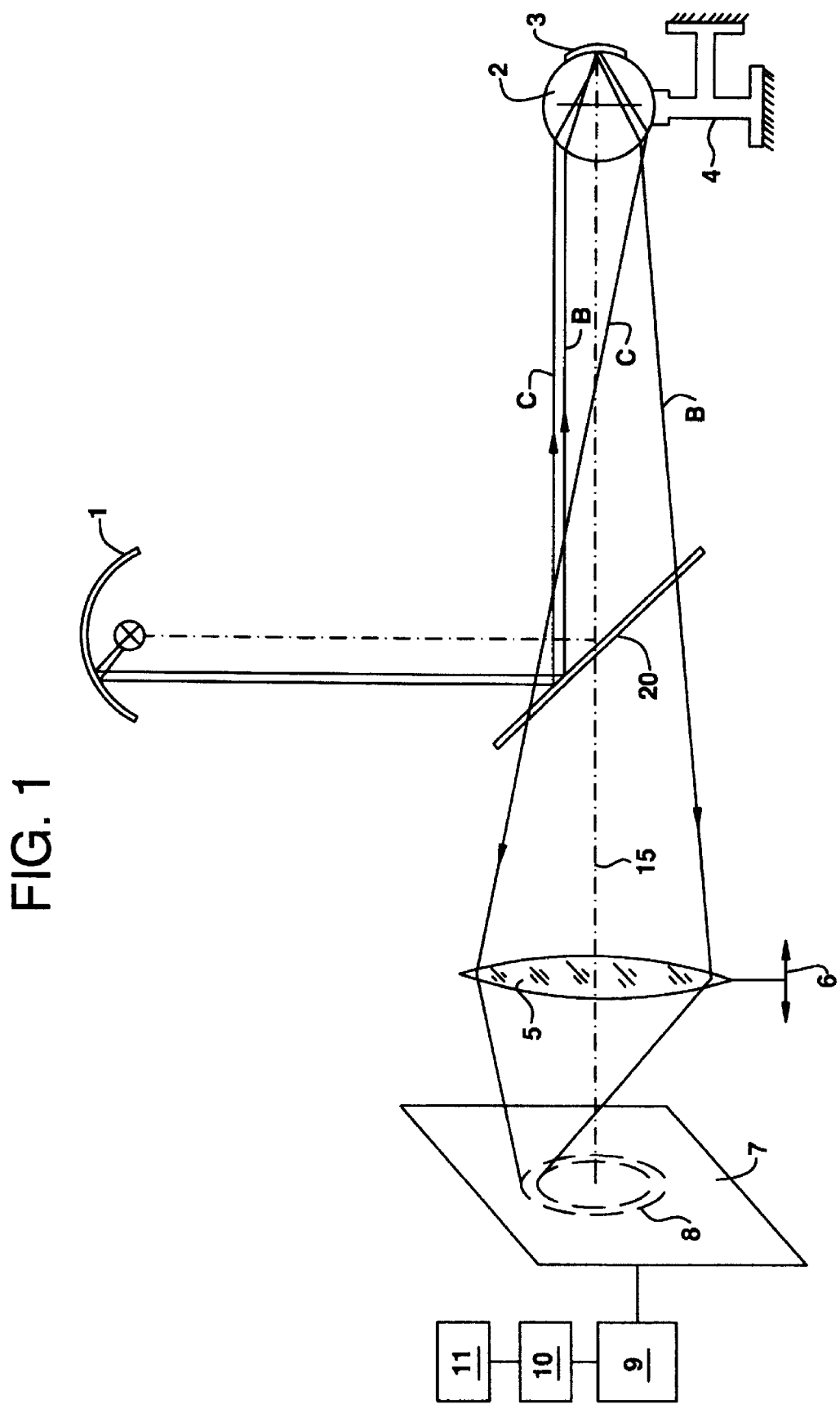
FIG. 1 shows a schematic representation of the subject matter of the invention having external target illumination.

Shown schematically in FIG. 1 is an optical arrangement having a spotlight 1 which, via a beam-splitting mirror 20, illuminates a spherical target 2 coaxially with respect to the optical axis 15, having a rod-shaped mount 4 as support for the target 2, an imaging system 5 with a focusing device 6, a position-resolving detector device 7, an evaluation device 9, an image processing computer 10 and a distance measuring device 11. The size relationships shown in FIG. 1 are not true to scale.

The optical beam path is shown for two selected, mutually parallel rays B and C. Drawn in here are only the courses of the rays which are decisive for the invention and which, following entry into the sphere 2 and reflection at its rear surface, emerge from the sphere 2 such that they are picked up by the imaging system 5. The material of the sphere 2 is transparent to the illumination radiation of the spotlight 1, the value of the refractive index lying between $\sqrt{2}$ and 2. Under this condition, the two rays B and C bound a bundle of rays which is picked up by the aperture of the imaging device 5 and can be imaged by the latter onto the position-sensitive detector device 7. The circular annular area 8 on the detector device 7 is produced by the totality of all bundles of rays which in relation to the bundles of rays B–C shown by way of example, are rotationally symmetrical to the optical axis 15.

To enhance the reflection in the rear part of the spherical target 2, partial silvering 3 may be used. If silvering is provided, the target 2 can, of course, no longer be placed in any rotation onto the mount 4, but must be aligned with the silvered area 3, as FIG. 1 shows.

The function of the beam-splitting mirror 20 will be explained below. In general, beam-splitting mirrors have the property of reflecting a specific part of the incident light and of transmitting the remaining other part. Drawn in FIG. 1 are only the rays coming from the spotlight 1 and reflected at the beam-splitting mirror 20, as well as the rays coming from the target 2 and transmitted through the beam-splitting mirror 20. The ray components which are complementary thereto and not drawn in here are lost and do not contribute to the imaging of the target. The reflecting of the illumination radiation via the beam-splitting mirror 20 therefore always means a certain light loss. On the other hand, however, a theodolite which has no integrated illumination can thereby be retrofitted with illumination in a simple way. It is necessary only to fit the beam-splitting mirror 20 in front of the objective of the theodolite telescope and for the targets to be illuminated coaxially using the spotlight 1, in order therewith to effect and to make use of an imaging of the reflected spherical zone of the target in accordance with the invention.

Figure 2:
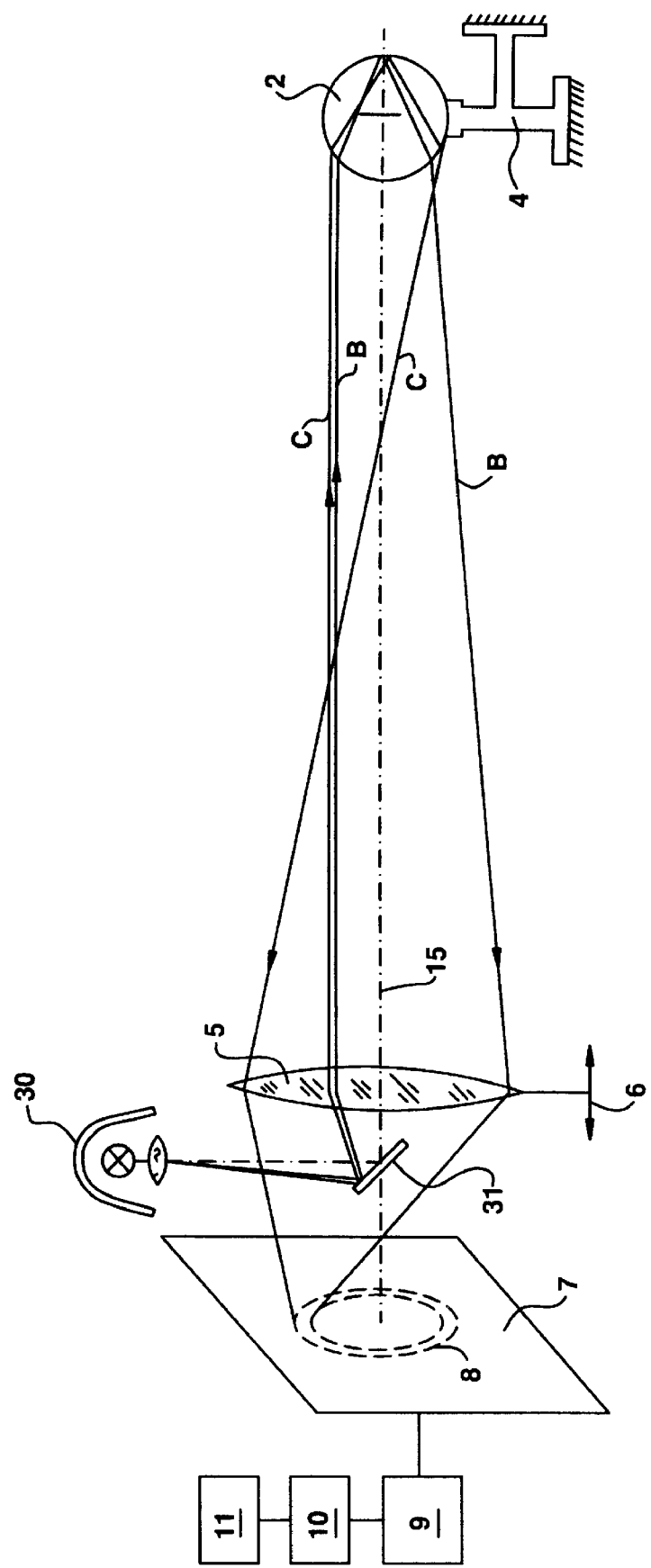
FIG. 2 shows a schematic representation of the subject matter of the invention with target illumination integrated in the theodolite.

FIG. 2 shows schematically an optical device like FIG. 1, but with target illumination integrated in the imaging system 5. A spotlight 30 illuminates the target 2 via a mirror 31 which is arranged on the optical axis 15 of the imaging system 5. The illumination is carried out likewise coaxially to the optical axis 15. The mirror 31 shadows a small central area of the imaging beam path, as a result of which some light for the imaging is lost. This arrangement corresponds to the theodolite system explained at the beginning.

Here, the target 2 has no partial silvering, so that it can be illuminated unrestrictedly from all sides, and the reflected rays always supply the circular annular area 8 on the position-sensitive detector 7. The presentation of this target image independent of the direction of illumination of a theodolite is especially suitable for the application of the triangulation method, with which the angles to the target 2 are determined from several theodolites.

Figure 3:
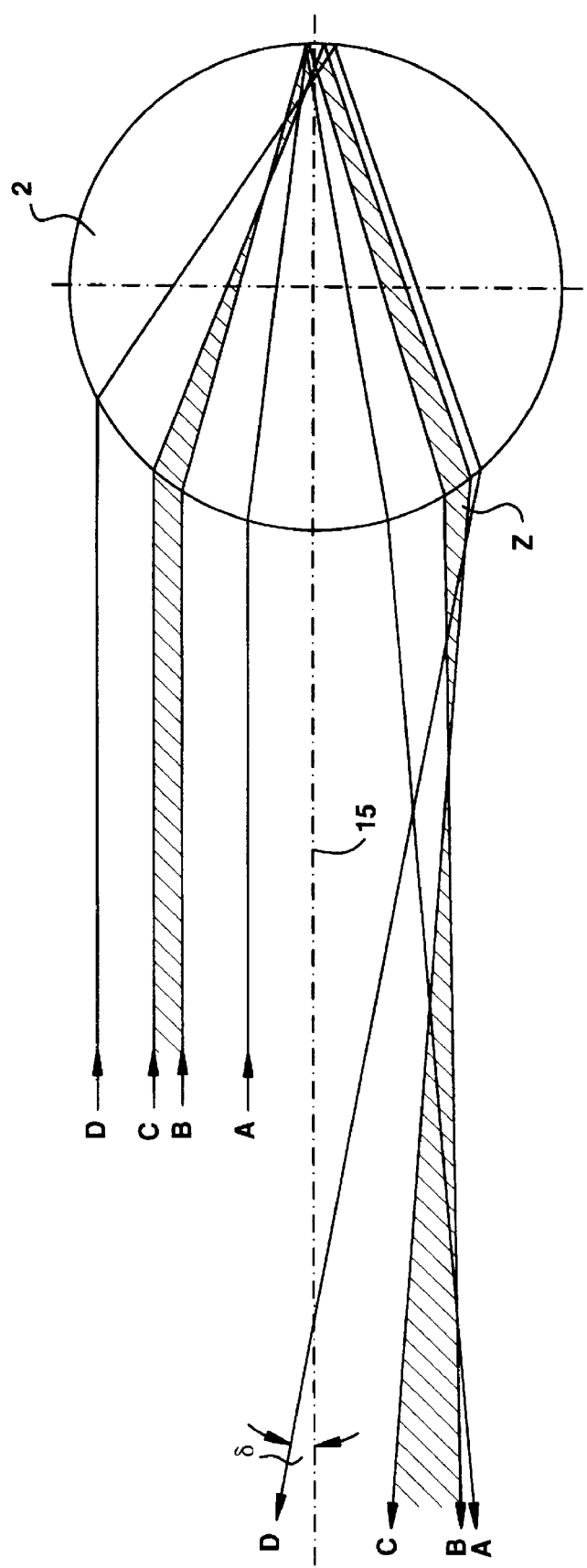
FIG. 3 shows a schematic representation of the course of the ray through a transparent sphere.

FIG. 3 shows schematically the courses of some rays in a sectional plane through the center of the sphere of the transparent target 2 having a refractive index between $\sqrt{2}$ and 2. For reasons of clarity, only the parallel rays A, B, C and D which are incident above the axis 15 are drawn in. Depending on the distance from the axis 15, after passing through the sphere the rays emerge once more from the sphere finally at different angles. The rays A and D are in this case reflected back at such exit angles that they pass by the optical imaging device 5 (FIG. 2). Only those rays within the region which is hatched and bounded by the rays B and C pass via the imaging device 5 onto the position-resolving detector 7.

The exit angle is to be understood as the angle between the ray reflected back and the axis 15. For example, for the ray D, its exit angle 6 is drawn in.

As a result of rotation about the axis 15, the spatial, 3-dimensional courses of the rays are yielded. This results in the formation on the sphere surface of that annular radiation zone Z which the detector 7 receives as circular annular area 8.

Figure 4:
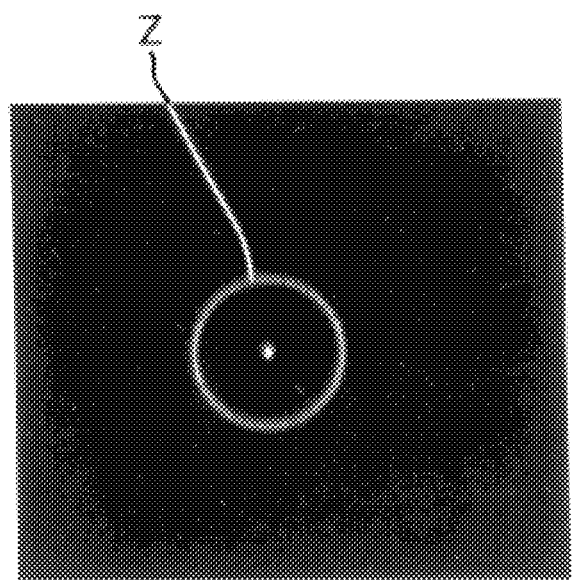
FIG. 4 shows a camera image of the transparent sphere which is being illuminated by the coaxially arranged spotlight of the video theodolite.

FIG. 4 is a camera picture of the reflected transparent sphere using the theodolite system mentioned at the beginning. The picture shows the annularly radiating zone Z of the sphere. It is used for the mathematical evaluation for determining the center of the target. The reflection of the radiation close to the axis is also seen at the center.

I claim:

1. An optical device for determining the position of a reflective target (2), having a light projector (1; 30) for illuminating the target (2), an imaging system (5) for imaging the target (2) on a location-resolving detector apparatus (7), and an evaluating apparatus (9) for determining position coordinates of a target image (8), wherein the target (2) includes a ball transparent to the light projector's light with a refractive index n between $\sqrt{2}$ and 2 such that upon its illumination by the light projector (1; 30) and its imaging by the imaging system (5), at least a portion of a circular area (8) is formed and is detected by the detector apparatus (7) so that an image evaluation of a center of the circular area (8) is determined and thus the position of the target (2) is given.

2. An optical device according to claim 1, wherein for the purpose of sighting the target (2) from all sides, a rod-shaped mount (4) is provided as a sphere support.

3. An optical device according to claim 1, wherein the target (2) is composed of glass having a refractive index n of 1.83.

4. An optical device according to claim 1, wherein the target (2) is surface-polished.

5. An optical device according to claim 1, wherein the target (2) has a reflection-enhancing coating.

6. An optical device according to claim 1, wherein the target (2) has materials of different refractive indices.

7. An optical device according to claim 1, wherein the target is partially silvered.

8. An optical device according to claim 1, wherein the illumination beam path to the target (2) runs axially symmetrically to the optical axis (15) of the imaging system (5).

9. An optical device according to claim 1, wherein the imaging system (5) has a focusing device (6).

10. An optical device according to claim 1, wherein the imaging system (5) is a theodolite telescope.

11. An optical device according to claim 1, wherein the detector apparatus (7) is a CCD array or a video camera.

12. An optical device according to claim 1, further comprising an image processing computer (10).

13. An optical device according to claim 1, wherein the light projector (1; 30), imaging system (5), detector apparatus (7) and evaluating apparatus (9) form an apparatus of compact structure.

14. An optical device according to claim 1, further comprising a distance measuring device (11).

15. An optical device according to claim 1, wherein a circle-fitting algorithm for the best fitting of a circle into the area (8) is provided for the image evaluation in order to determine the center of said at least a portion of a circular area.

16. A method for determining the position of a reflective target (2), using a light projector (1; 30) for illuminating the target (2), a focusable imaging system (5) for imaging the target (2) on a location-resolving detector apparatus (7), and an evaluating apparatus (9) for determining location coordinates of a target image (8), comprising the step of using a target (2) which includes a transparent ball with a refractive index n between $\sqrt{2}$ and 2 which is illuminated with the light projector (1; 30) such that upon defocusing of the imaging system (5), multiple circle areas thus occurring are imaged on the detector apparatus (7) and at least one center of an area is determined by mathematical techniques to provide the position of the target (2).

17. A reflective target for measuring, comprising:

a transparent ball having a refractive index n between $\sqrt{2}$ and 2 such that upon illumination of the ball, an at least partially circular image is created whose center indicates the position of the ball.

18. A reflective target as set forth in claim 17, wherein the target is composed of glass having a refractive index n of 1.83.

19. A reflective target as set forth in claim 17, wherein the target is surface-polished.

20. A reflective target as set forth in claim 17, wherein the target has a reflection-enhancing coating.

21. A reflective target as set forth in claim 17, wherein the target has materials of different refractive indices.

22. A reflective target as set forth in claim 17, wherein the target is partially silvered.

* * * * *